(No Model.) 5 Sheets—Sheet 2.

J. R. WILLIAMS.
CIGAR BUNCHING MACHINE.

No. 419,742. Patented Jan. 21, 1890.

WITNESSES:
Gustave Dieterich.
William Goebel.

INVENTOR
John R. Williams,
BY Chas. C. Gill
ATTORNEY (No Model.) 5 Sheets—Sheet 3.

J. R. WILLIAMS.
CIGAR BUNCHING MACHINE.

No. 419,742. Patented Jan. 21, 1890.

WITNESSES: Gustave Dieterich. William Goebel.

INVENTOR John R. Williams, BY Chas. O. Gill ATTORNEY (No Model.)  5 Sheets—Sheet 5.

J. R. WILLIAMS.
CIGAR BUNCHING MACHINE.

No. 419,742.  Patented Jan. 21, 1890.

WITNESSES:
Gustave Dieterich
William Goebel.

INVENTOR
John R. Williams
BY
Chas. C. Gill
ATTORNEY

UNITED STATES PATENT OFFICE.

JOHN R. WILLIAMS, OF NEWARK, NEW JERSEY, ASSIGNOR TO THE JOHN R. WILLIAMS COMPANY, OF NEW YORK, N. Y.

CIGAR-BUNCHING MACHINE.

SPECIFICATION forming part of Letters Patent No. 419,742, dated January 21, 1890.

Application filed April 29, 1889. Serial No. 308,974. (No model.)

*To all whom it may concern:*

Be it known that I, JOHN R. WILLIAMS, a citizen of the United States, and a resident of Newark, in the county of Essex and State of New Jersey, have invented certain new and useful Improvements in Cigar-Bunching Machines, of which the following is a specification.

The invention relates to improvements in cigar-bunching machines; and it consists in novel mechanism, hereinafter particularly described, by which the tobacco for the filler of cigars is apportioned into suitable quantities and said proportionate parts in succession conveyed to the rolling mechanism by which the binder is applied.

The invention is illustrated in the accompanying drawings, in which—

Figure 1:
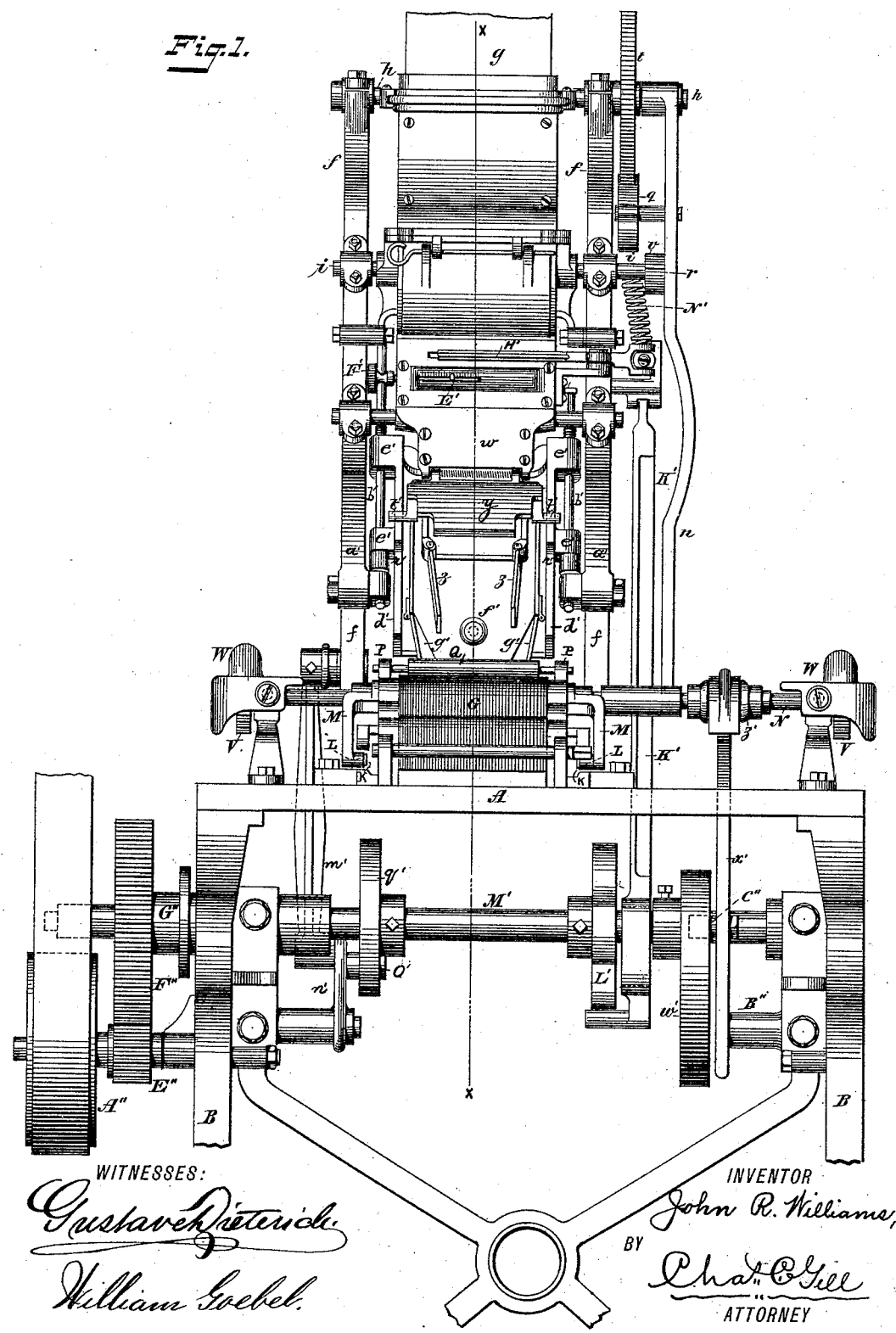
Figure 2:
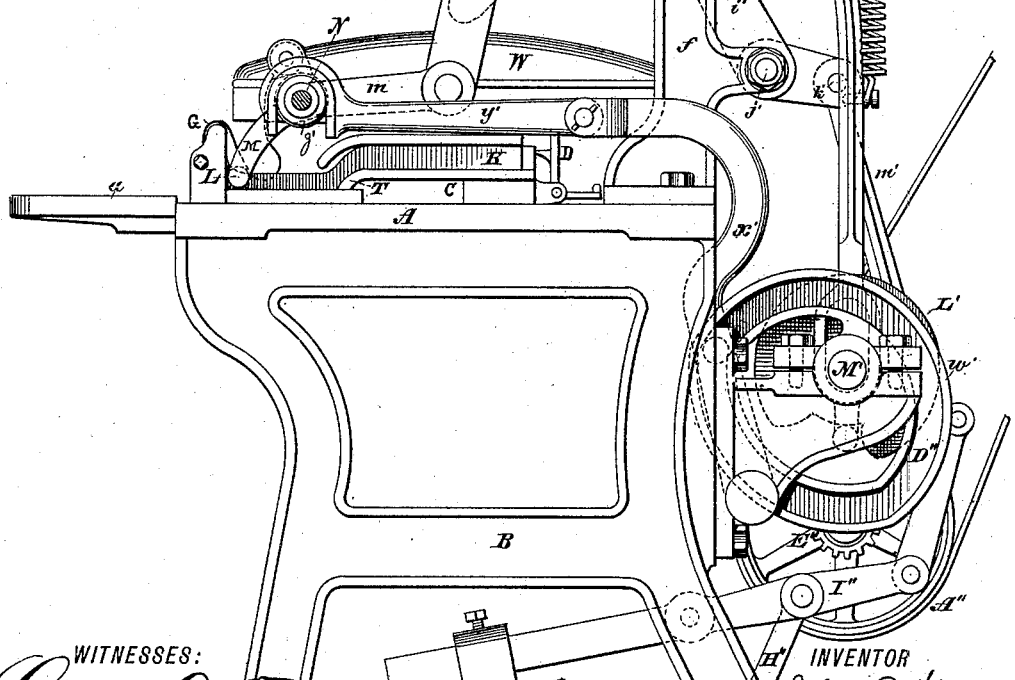
Figure 3:
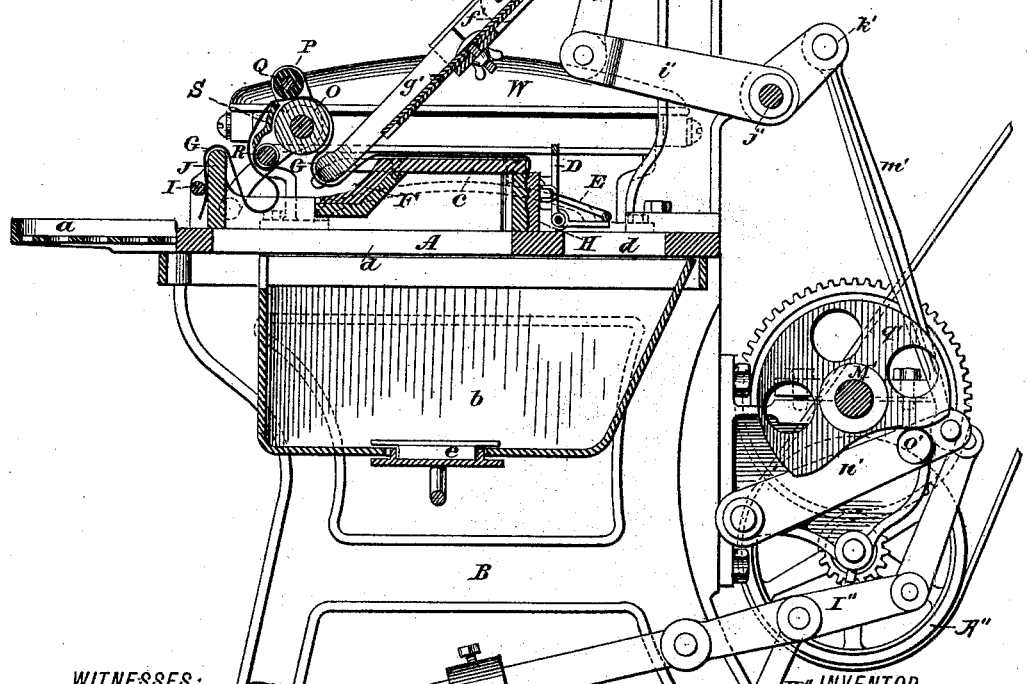
Figure 4:
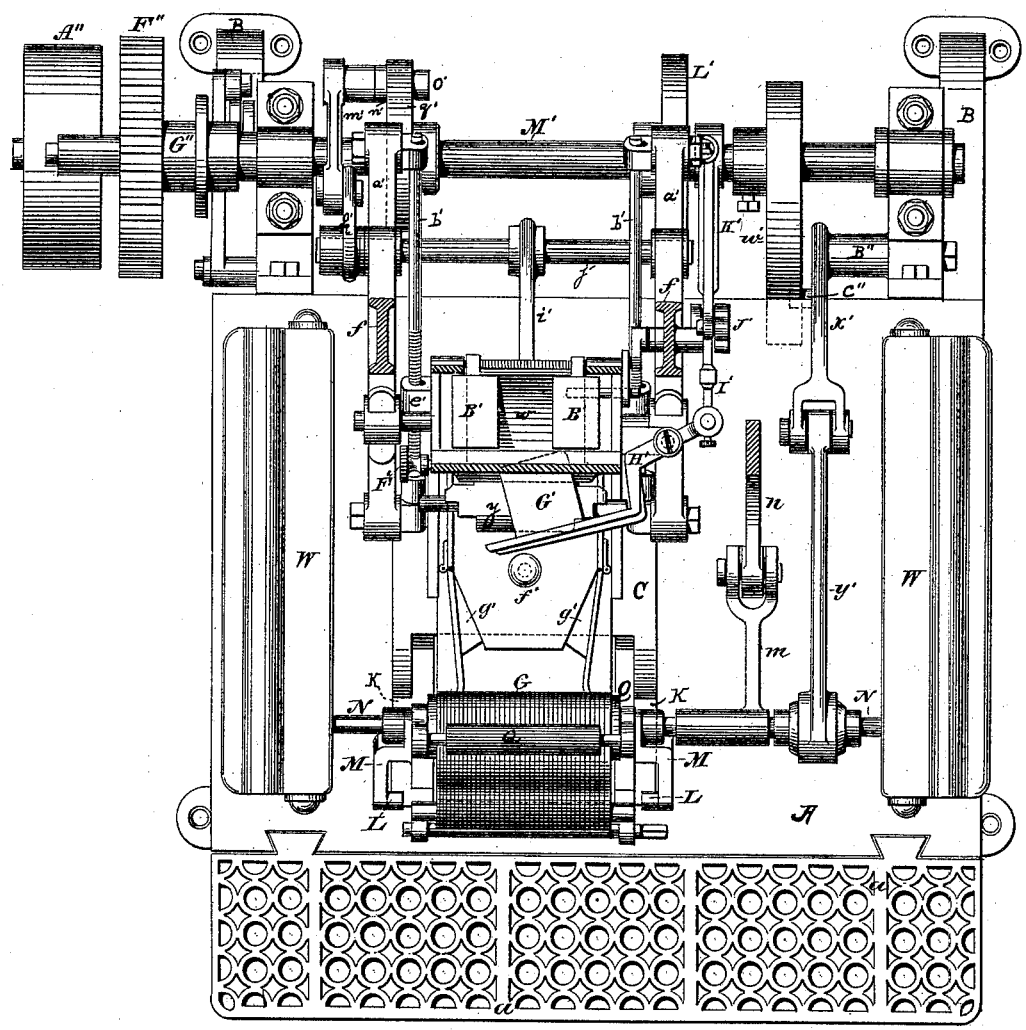
Figure 5:
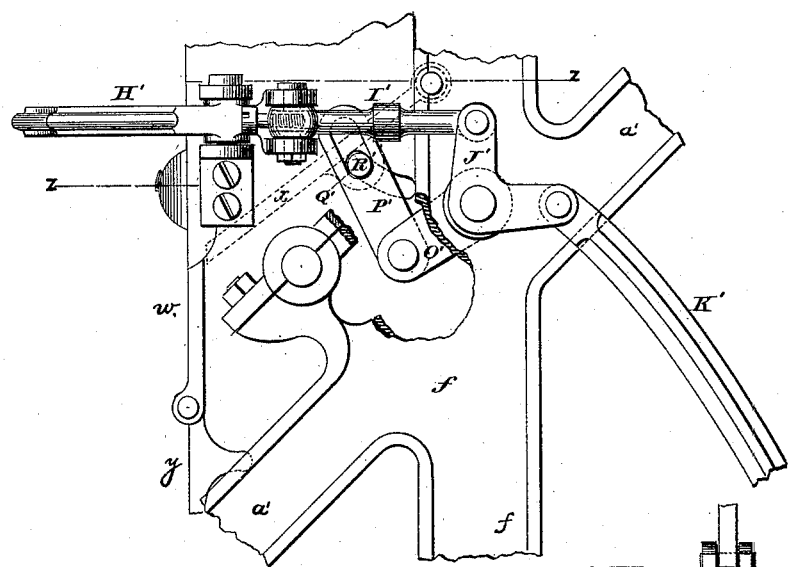
Figure 6:
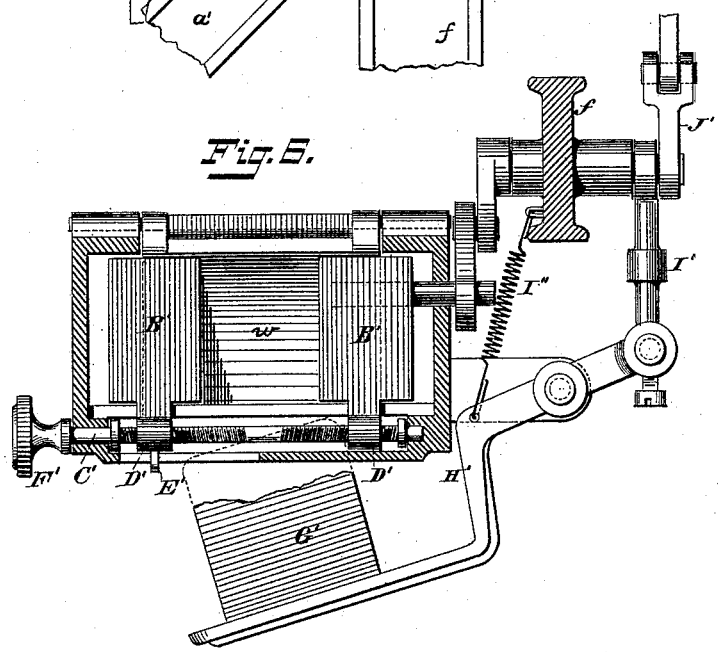

Figure 1 is a front elevation of the machine, the upper portion of the hopper for the filler-tobacco in bulk being broken away and the lower portion of the table supporting the operative mechanism omitted; Fig. 2, a side elevation of same, looking at the right-hand side of Fig. 1; Fig. 3, a central vertical section of same on the dotted line X X of Fig. 1. Fig. 4 is a transverse section of the machine on the dotted line Y Y of Fig. 2. Fig. 5 is an enlarged side elevation, partly broken away, of the frame for supporting the main hopper and with the charge-receptacle beneath said hopper. Fig. 6 is a transverse section on the dotted line Z Z of Fig. 5; Fig. 7, a detached central longitudinal section through the rolling mechanism, showing the position of the parts after the chute $f'$ has been elevated and the pocket in the apron closed by the roller O, hereinafter referred to; and Fig. 8 is a like view of same, illustrating the position of the rollers while rolling the bunch.

In the drawings, A designates the bed-plate of the machine, said bed-plate being mounted upon legs B, and being provided at about its center with the elevated rolling-table C, having at its rear end the triangular-shaped frame D, which is given a spring-tension toward the table C by the spring E, and operates as a bunch-receiver to receive the bunches after they have been rolled from the rear end of the rolling-table C in a well-known manner. The front portion of the table C contains the depression F, and in this depression the pocket in the rolling-apron G is formed to receive the tobacco for the bunch. The rear end of the rolling-apron G is secured at the rear end of the rolling-table C by the plate H, and the front end of said apron is secured between the rod I and upright J, as shown in Fig. 3. Upon the outer sides of the rolling-table C are formed the tramways K, to receive the inwardly-turned ends L of the arms M, which are loosely collared upon the reciprocating rod N, which carries the reciprocating roller O, for aiding in rolling the bunch, as indicated in Figs. 3 and 4. The arms M are formed with the upwardly-extending plates P, which carry the tension-roller Q, which lightly impinges that portion of the apron G upon the roller O.

Between the arms M and below the roller O is journaled the roller R. The arms M in front of the rollers O R are connected by a guard-plate S, as indicated in section in Fig. 3, over which the apron G passes, and by which said apron is prevented from entering between the said rollers O R. The arms M, with the plates P, guard S, and rollers Q R, constitute a frame which has a rocking movement on the reciprocating rod N during the operation of the machine. When during the operation of rolling bunches the reciprocating rod N is moved toward the rear end of the machine, the inwardly-turned ends L of the arms M enter the tramways K at each side of the machine and roller O first closes the pocket in the apron G, and then the inwardly-turned ends L of the arms M ride up the inclines T (see Fig. 2) of the tramways K, and thus bring the roller R over the pocket in the apron G, and it at that time performs the rolling operation, pressing closely upon the tobacco in the pocket and rolling the same into the binder, and then off of the rear end of the table C into the bunch-receiver D. When the inwardly-turned ends L of the arms M ride by the inclines T, said arms will have a hinged movement upward on the rod N, whereby the roller R is brought into position to do the rolling. The roller O during the operation of the machine closes the pocket in the apron G and prevents any of the tobacco therein from being projected forward upon the apron beyond said pocket, and thus operates in closing the pocket to confine the filler-tobacco until such time as the roller R has been elevated into position to perform the rolling of the bunch.

Some difficulty is experienced in cigar-bunching machines to prevent the loose tobacco in the pocket of the apron from being thrown forward when the forming-rollers commence to operate, and these difficulties have been overcome in the present invention by the use of the rollers O R—the former to close the pocket and the latter to thereafter roll the bunch. The purpose of the roller Q is to maintain a light tension on the apron G and to aid in returning said apron to the front end of the rolling-table during the movement of the forming-roller from the rear end of said table toward the front end thereof after a bunch has been rolled into the receiver D. The return of the slack in the rolling-apron G to the front end of the rolling-table by means of the roller Q avoids the necessity of the attendant drawing said slack frontward by the hand after the formation of each bunch. The ends of the reciprocating rod N carry pinion-wheels V, as shown in Fig. 1, which engage inverted racks, as shown in Letters Patent of the United States granted to me on the 9th day of April, 1889, (said racks being in the present drawings obscured from view by the protecting-covers W,) which pinions and racks serve to maintain a uniform reciprocating movement in the ends of the rod N.

Upon the front edge of the table A is provided an extension $a$, to temporarily receive the binders to be used in the formation of the bunches, and upon the under side of the table A is provided the receptacle $b$, to receive, through the openings $d$ in the table, any filler-tobacco which may become spilled upon said table, or the product of imperfectly-formed bunches, if any should result through the inadvertence of the operator. The receptacle $b$ will be provided with a door $e$ at the bottom thereof, in order at the proper time to facilitate the emptying of the receptacle. At the opposite sides of the rolling-table C and at the rear edge of the bed-plate A are secured the standards $f\,f$, which constitute frames supporting the main hopper $g$ for containing the loose filler-tobacco in bulk. The standards or frames $f\,f$ also form bearings for the ends of the transverse feed-shafts $h\,i$, which carry within the lower portion of the hopper $g$ the radial plates $j\,j$, as indicated in Fig. 3, by which the tobacco is fed downward to the opening $k$ in the lower end of said hopper $g$. The feed-shafts $h\,i$ have movement imparted to them from the reciprocating rod N and jointed arms $m\,n$ through the pawl $q$ and rack $r$, the pawl engaging the ratchet $t$ on the shaft $h$ and the rack $r$ engaging the pinion $v$ on the end of the shaft $i$, as shown in Fig. 2.

Below the hopper $g$ is provided the charge-receptacle $w$, which contains an inner door $x$, dividing said receptacle $w$ into two compartments, as shown in Fig. 3, the lower compartment being also provided with a door $y$ and carrying the hinged plates $z$, which serve to aid in the distribution of the filler-tobacco for the bunches, as hereinafter described. The upper compartment of the charge-receptacle $w$ is provided with sliding partitions A′, which are formed with the horizontal plates B′, (see Fig. 6,) which are mounted at one end upon the screw C′, the latter being at its ends provided with right and left hand threads, respectively, which engage the internal threads in the sleeves D′, connected with said plates B′, the purpose of the screw being to enable the attendant to adjust the position of the partitions A′ with the plates B′ toward or from each other whenever it is desired to decrease or increase the capacity of the upper compartment of the charge-receptacle $w$ above the door $x$. The space between the inner edges of the plates B′ B′ (see Fig. 6) is directly below the opening $k$ in the lower end of the hopper $g$ and forms the source of communication between said hopper $g$ and the charge-receptacle $w$.

The position of the partitions A′ in the charge-receptacle $w$ and the extent of their adjustment may be regulated at will by means of the index-finger E′, carried by the sleeve D′, said index-finger E′ passing forward through a slot in the front end of the charge-receptacle, as indicated in Figs. 1 and 6, and being in engagement with an index-rack. (Shown in Fig. 1.) The end of the screw C′, by which the partitions A′ may be adjusted, is provided with a head F′, located at one side of the charge-receptacle in convenient position for operation by the attendant.

In order to cut off the supply of tobacco in the hopper $g$ from the charge-receptacle $w$, there is provided a gate or valve G′. (Shown enlarged in Fig. 6 and on a reduced scale in Fig. 3.) The valve G′ consists of a flat plate of metal adapted to pass through a slot provided for it in the upper front portion on the charge-receptacle $w$, as indicated in Fig. 3, and it passes immediately beneath the plates B′ B′, in which position it will close the entrance from the hopper $g$ and separate that portion of the filler-tobacco in the upper compartment of the charge-receptacle $w$ from the tobacco in the hopper $g$ preparatory to said separated charge of tobacco being delivered to the rolling mechanism. The valve G′ is secured to the pivoted arm H′, and is given a spring-tension toward its position within the upper part of the charge-receptacle, which is its closed position, by means of the spring I″. (See Fig. 6.)

The operation of opening the valve G′ after the charge of tobacco has fallen into the lower compartment of the charge-receptacle $w$ is effected by the rod I′, bell-crank lever J′, and rod K′, the lower end of the latter being in contact with the cam L′ on the main drivpurpose of depositing the charge of tobacco from the upper apartment of the charge-receptacle $w$ into the lower apartment thereof in position to be quickly transmitted to the apron G as soon as the rollers O R have returned to their position at the front of the rolling-table, as illustrated in Fig. 3. It will thus be observed that while the chute $f'$ is at its lower position delivering a charge of tobacco to the apron G another charge of tobacco is being prepared above the door $x$ of the charge-receptacle $w$ preparatory to being dropped into the lower compartment of the charge-receptacle $w$ below the door $x$ as soon as the frame $d'$ and chute $f'$ have ascended on the rods $b'$ and closed the door $y$, which is only opened by the descent of the frame $d'$ to permit the escape of the tobacco down the chute $f'$.

The reciprocating movement of the rollers O R is created from the main driving-shaft M' through the cam $w'$, rod $x'$, and arm $y'$, the latter being at its front end hooked upon a sleeve $z'$, as shown in Figs. 1 and 2, which is upon the rod N, which forms the axle of and carries the roller O and arms M. The lower end of the rod $x'$ is pivoted to the stud B'' (see Fig. 1) and carries a stud C'', which travels in the groove D'' of the cam $w'$. The revolution of the cam $w'$ imparts a rocking movement to the rod $x'$, and this through the arm $y'$ operates to reciprocate the rod N with the rollers for rolling the bunch, and the reciprocating movement of the rod N operates, through the rod $n$, rack $r$, and pawl $q$, to effect the rotary movement of the feed-shafts $h\ i$ for feeding the tobacco downward to the charge-receptacle $w$.

The main driving-shaft M' receives its movement, when it is desired to operate the machine by steam-power, from the driving-wheel A'' and gear-wheels E'' F'', the latter being upon the shaft M' and being provided with the usual clutch-sleeve G'', which will be permitted in the customary manner to connect with the gear-wheel F'' when it is desired that the shaft M' shall be set in motion. The clutch-sleeve G'' will be operated in the customary manner by a treadle (not shown) connected with the rod H'', (shown in Fig. 3,) which when depressed by the pressure of the foot of the treadle will lower the lever I'' and permit the sleeve G'' to engage the gear-wheel F'' in the customary manner. After the foot has been released from the foot-treadle the counterpoise J'' will throw the rod H'' and lever I'' upward between the sleeve and gear-wheel and disengage one from the other, at which time the driving-wheel A'' may rotate without affecting the shaft M'.

The gearing E'' F'', with the clutch-sleeve G'', forms no part of my present invention, and is a well-known mechanism for applying power to the driving-shaft of machinery.

The operation of the machine in the known state of the art will be readily understood from the foregoing description without elaborate explanation. The filler-tobacco in scrap form is placed in the hopper $g$, and is fed downward to the charge-receptacle by the radial blades $j$ on the feed-shafts $h\ i$, the door $x$ being closed and the gate G' open. The rollers O R being at the front portion of the rolling-table, the chute $f'$ and frame $d'$ descend, forming a pocket in the rolling-apron G and opening the door $y$, through which a charge of tobacco from the lower compartment of the receptacle $w$ may pass down the chute $f'$ into said pocket, the binder having previously been placed upon the apron at the rear edge of the depression F of the rolling-table to be rolled around the charge of tobacco. The motion of the driving-shaft then operates through the cam $q'$, rod $m'$, arm $k'$, lever $i'$, and link $h'$ to elevate the frame $d'$ and chute $f'$ clear of the rolling-table and closing the door $y$, while at the same time the motion of said shaft M' operates through the cam $w'$, rod $x'$, arm $y'$, and rod N to draw the rollers O R along the table C, rolling the bunch and depositing it in the bunch-receiver D, the roller O during this movement closing the pocket, and the arms M by reason of the tramways K being elevated to bring the roller R into position to roll the bunch during the rearward movement of the rod N and rollers O R to effect the rolling of the bunch. The cam L', through the rod K', bell-crank lever J', and rod I', operates to close the gate G', while the arm O' and link P', receiving movement at the same time from the bell-crank lever J', opens the door $x$, permitting the charge of tobacco measured above said door to fall into the lower portion of the charge-receptacle $w$. Upon the depositing of the bunch into the bunch-receiver D the cams on the driving-shaft M' and their connections return the rod N, with the rollers O R, to their position at the front end of the rolling-table, and, then permitting the descent of the frame $d'$ and chute $f'$ to their lower position, open the door $y$, upon which the charge of tobacco will pass down the chute $f'$ into the pocket of the rolling-apron G preparatory to being rolled into a bunch, the timing of the mechanism being such that when the chute $f'$ descends the rod K' and bell-crank lever J' will close the door $x$ and open the gate G' in order to prepare another charge of tobacco for delivery to the lower portion of the charge-receptacle $w$ upon the next ascent of the chute $f'$ and frame $d'$. Upon the rods $b'$, sustaining and forming guides for the frame $d'$, I have placed springs K'', for the purpose of acting as buffers to prevent noise and jarring upon the upward movements of the chute $f'$ and frame $d'$. The bunches are one after another rolled into and taken by hand from the bunch-receiver D, the usual wooden mold being provided in convenient position to receive them.

Power may be applied to the driving-shaft M' either by steam, as illustrated in the drawings, or by hand, as may be desired, and, if ing-shaft M' of the machine, as shown in Figs. 1 and 2. The lower portion of the rod K' has an elongated slot encircling said driving-shaft M', as shown in Figs. 1 and 2, and the lower extremity of said rod is preserved in contact with the cam L' by means of the spring N'. (Shown more clearly in Fig. 2.) During the operation of the machine from the driving-shaft, the rod K' is given a substantially vertical reciprocating movement by means of the cam L', and in turn imparts a rocking movement to the bell-crank lever J', which reciprocates the rod I', and thereby causes the arm H' to have a rocking movement on its pivot and to force the valve G' into position in the upper portion of the charge-receptacle $w$, or to retract said valve therefrom. In the operation of the machine the cam L' draws the rod K' downward, and this through the bell-crank lever J' draws the rod I' toward the rear, and this actuates the arm H' to withdraw the valve G' from the charge-receptacle $w$, after which the cam elevates the rod K' and the spring I'' is permitted to retract the arm H' to its former position, whereby the valve G' is again projected into the charge-receptacle $w$.

To the bell-crank lever J' is secured the arm O', to which is pivoted the link P', the latter containing a slot Q', encircling the pin R' of the door $x$, (see Fig. 5,) the purpose of the arm O' and link P' being to effect the opening and closing of the door $x$ during the movement imparted to the rod K' by the cam L'. The movements of the arm O' and link P' are such with relation to the reciprocating movement of the rod I' that the door $x$ will open downward when the valve G' is closed, and will close upward again to the position illustrated in Figs. 3 and 5 when the valve G' is open. When the valve G' is open, the filler-tobacco will pass into the charge-receptacle $w$ and fill the compartment formed between the partitions A', the dimensions of said compartment being sufficient to receive the filler of a single bunch, and when the valve G' is closed the charge of tobacco for the bunch will be separated from the main body of the tobacco in the hopper $g$, and the door $x$ will open and allow said charge to fall into the lower portion of the charge-receptacle $w$, from which it will escape at the proper time by the opening of the door $y$, as hereinafter described.

Between the frames $f$ and their extensions $a'$ are secured the inclined rods $b'$, upon which the casting or frame $d'$ has a reciprocating movement during the operation of the machine. The frame $d'$ is provided with apertured lugs $e'$, which fit upon said rods $b'$, as illustrated in Fig. 1. The frame $d'$ is a casting upon which is secured the sheet-metal chute $f'$, having adjustable wings $g'$ at its lower end for the purpose of adjusting the width of the lower end of the chute in a well-known manner. The chute $f'$, with its adjustable wings $g'$, is not independently sought to be claimed in the present application. The frame $d'$ is connected with the link $h'$, (shown in Fig. 3,) which is pivoted to the rocking lever $i'$, the latter being mounted upon the rod $j'$ and having an arm $k'$, to which is pivotally secured the upper end of the rod $m'$, the lower end of said rod $m'$ being pivoted to the rod $n'$, carrying a stud $o'$, which impinges the surface of the revolving cam $q'$, mounted upon the main driving-shaft M'.

During the operation of the machine the revolution of the cam $q'$ operates alternately to depress and permit the elevation of the stud $o'$ and rod $m'$, which imparts its movement through the arm $k'$, rocking lever $i'$, and link $h'$ to the frame $d'$, giving the latter a reciprocating movement on the inclined rods $b'$, the purpose being to elevate the frame $d'$ with the chute $f'$ during the operation of rolling a bunch on the table C, and to permit the descent of said frame $d'$ and chute $f'$ to the position illustrated in Fig. 3, when it is desired that a charge of filler-tobacco shall be deposited in the pocket on the rolling-apron G preparatory to being rolled into a bunch.

Upon the sides of the casting or frame $d'$ are formed the shoulders $r'$, and above said sides and adapted to travel over said shoulders are lugs $t'$, (shown more clearly in Figs. 1 and 3,) which are connected with the door $y$ at the lower end of the charge-receptacle $w$. The sides of the casting or frame $d'$ with the shoulders $r'$ operate as cams for opening and closing the door $y$ at the proper time. When the frame $d'$ and chute $f'$ are in their lower position, as illustrated in Figs. 1 and 3, the lugs $t'$ are upon the highest points of the sides of the frame $d'$ and hold the door $y$ in an open position; but when the frame $d'$ and chute $f'$ are elevated the lugs $t'$ pass down the shoulders $r'$ and permit the door $y$ to close.

It will be understood from the foregoing description that the charges of filler-tobacco from the hopper $g$ first pass into the apartment of the charge-receptacle $w$ above the door $x$, the gate G' being open, and that after the said apartment has become filled the gate G' closes and the door $x$ opens. The opening of the door $x$ occurs when the chute $f'$ and frame $d'$ are in an elevated position with the door $y$ closed. At this time the charge of tobacco for the bunch is in the lower apartment of the charge-receptacle $w$ preparatory to being delivered to the rolling mechanism. The frame $d'$ and chute $f'$ then descend, opening the door $y$ and permitting the charge of tobacco to slide down the chute into the pocket of the rolling-apron G, while at the same time, and before the door $y$ has been fully opened, the door $x$ closes and the gate G' opens, permitting another charge of tobacco to enter the upper apartment of the charge-receptacle $w$, after which the chute $f'$ ascends to permit the rolling of the bunch on the table C and to close the door $y$ in order that the gate G' may close and the door $x$ open for the preferred, the chute $f'$ may be omitted and the hopper $g$ and charge-receptacle $w$ brought close to the rolling-table, so that upon the opening of the door $y$ the tobacco may fall at once upon the rolling-apron G.

What I claim as my invention, and desire to secure by Letters Patent, is—

1. In a cigar-bunching machine, the elevated hopper for scrap tobacco, and having an outlet at its lower end, combined with the charge-receptacle $w$ at the lower end of said hopper, the cut-off gate G' between said hopper and said receptacle, the inner door $x$ within said receptacle, the door $y$ at the lower end of said receptacle, mechanism, substantially as described, for opening the gate G' and door $y$ at the time of closing the inner door $x$, and closing the gate G' and door $y$ at the time of opening the door $x$, a sliding chute for conveying the charges of tobacco downward from the receptacle $w$, and bunch-rolling mechanism for receiving the charges of tobacco from the chute and rolling them, substantially as and for the purposes set forth.

2. In a cigar-bunching machine, the rolling mechanism and the elevated hopper for containing the tobacco in bulk, combined with the sliding chute between said rolling mechanism and said hopper, the charge-receptacle $w$, containing the gate G', inner door $x$, and discharge-door $y$, and mechanism, substantially as described, for imparting movement to the chute and for closing the door $x$ of the charge-receptacle at the time of opening the gate G' and door $y$, and opening the door $x$ at the time of closing the gate G' and door $y$, substantially as set forth.

3. The rolling mechanism and the elevated hopper for containing the tobacco in bulk, combined with the charge-receptacle below said hopper and the said sliding chute for delivering the charges of tobacco to the rolling-apron, said receptacle being provided with the inner door $x$, gate G', door $y$, adjustable partitions A', connected with the adjusting-screw C', and mechanism, substantially as described, for imparting motion to said chute and for operating the gate G' and doors $x\ y$, substantially as set forth.

4. In a cigar-bunching machine, the rolling-table C, having tramways K at its sides, combined with the rod N, roller O, pivoted arms M, mounted upon said rod, and the roller R, mounted between said arms M, said arms having studs adapted to travel in the tramways K, substantially as and for the purposes set forth.

5. In a cigar-bunching machine, the rolling-table C, apron G on said table, the reciprocating rod N, the roller O on said rod, the pivoted arms M, carrying the roller R and being mounted on said rod, and tramways K at the sides of the table C, and adapted to receive studs on the lower ends of the arms M, combined with an elevated hopper for containing the tobacco in bulk, a charge-receptacle for measuring the charges of tobacco, and a sliding chute for delivering the charges of tobacco to the rolling mechanism, substantially as and for the purposes set forth.

6. In a cigar-bunching machine, the rolling mechanism and elevated hopper for containing the tobacco in bulk, combined with the charge-receptacle below said hopper, and a sliding chute for conveying the tobacco from said receptacle to the rolling mechanism, said receptacle having the gate G' at its upper end, an outlet-gate at its lower end, and hinged blades $z$, for distributing the tobacco leaving the receptacle, substantially as and for the purposes set forth.

7. In a cigar-bunching machine, the rolling mechanism and the elevated hopper for containing the tobacco in bulk, combined with the inclined rods $b'$, frame $d'$, chute $f'$, carried by said frame, the charge-receptacle $w$, having the gate G', inner door $x$, and discharge-door $y$, and mechanism, substantially as described, for imparting a sliding movement to said frame and chute and for operating the gate G' and doors $x\ y$, substantially as and for the purposes set forth.

Signed at New York, in the county of New York and State of New York, this 13th day of April, A. D. 1889.

JOHN R. WILLIAMS.

Witnesses:
   CHAS. C. GILL,
   W. A. C. MATTHIE.